(12) United States Patent
Low

(10) Patent No.: US 6,986,468 B2
(45) Date of Patent: Jan. 17, 2006

(54) HOME COMFORT CONTROL USING COMBINED TEMPERATURE AND HUMIDITY MEASUREMENTS

(76) Inventor: David Nicholson Low, 1425 Athens Rd., Wilmington, DE (US) 19803

( * ) Notice: Subject to any disclaimer, the term of this patent is extended or adjusted under 35 U.S.C. 154(b) by 169 days.

(21) Appl. No.: 10/716,849

(22) Filed: Nov. 20, 2003

(65) Prior Publication Data

US 2005/0109854 A1   May 26, 2005

(51) Int. Cl.
*G05D 23/00*   (2006.01)
(52) U.S. Cl. ............. 236/44 C; 236/68 B; 62/176.6
(58) Field of Classification Search .......... 236/44 R, 236/44 A, 44 C, 91 R, 91 C, 68 R, 68 B; 62/176.1, 176.3, 176.6
See application file for complete search history.

(56) References Cited

U.S. PATENT DOCUMENTS

| | | | | |
|---|---|---|---|---|
| 2,059,846 A | * | 11/1936 | Bulger | ............... 236/44 C |
| 2,106,083 A | * | 1/1938 | Chappell et al. | .......... 236/44 C |
| 2,949,513 A | * | 8/1960 | Davidson | ................. 200/61.06 |
| 3,080,465 A | * | 3/1963 | Pelishek | ..................... 337/300 |
| 3,859,616 A | * | 1/1975 | Ladany | ....................... 337/300 |
| 4,350,023 A | * | 9/1982 | Kuwabara et al. | ......... 62/176.6 |
| 5,732,879 A | * | 3/1998 | Low | ......................... 236/44 R |
| 5,737,934 A | * | 4/1998 | Shah | ......................... 62/176.6 |
| 6,843,068 B1 | * | 1/2005 | Wacker | ..................... 62/176.6 |
| 6,892,547 B2 | * | 5/2005 | Strand | ....................... 62/176.6 |

* cited by examiner

Primary Examiner—Harry B. Tanner

(57) ABSTRACT

This thermostat controls to a constant ratio of temperature and humidity to give approximately constant comfort. It is especially suited for residences with air conditioning equipment but without specific humidity lowering equipment. The thermostat significantly reduces air conditioner running time without degrading comfort as humidity declines in its air-conditioned space. During winter operation the thermostat characteristically raises its dry bulb set point as humidity decreases.

1 Claim, 4 Drawing Sheets

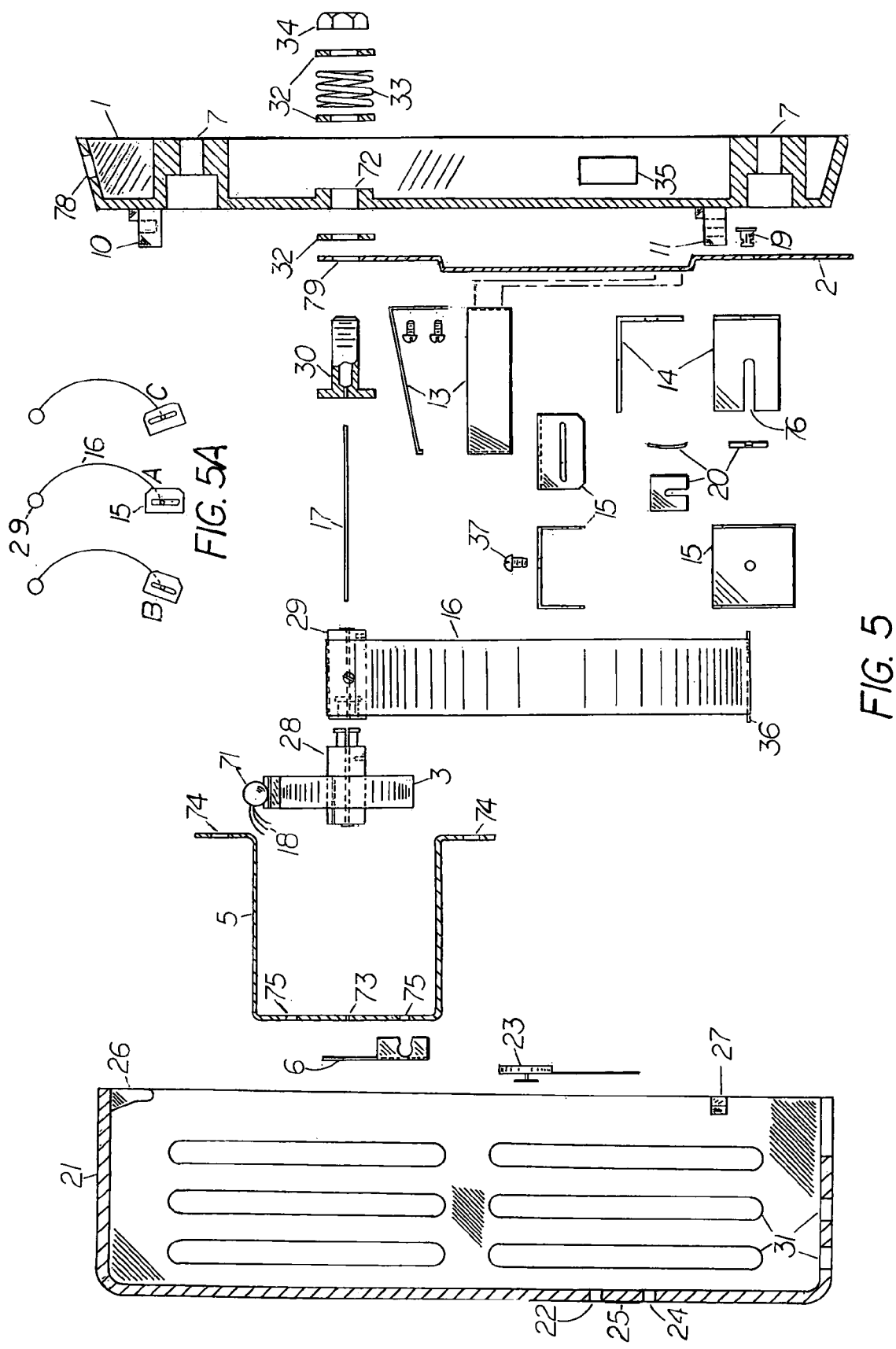

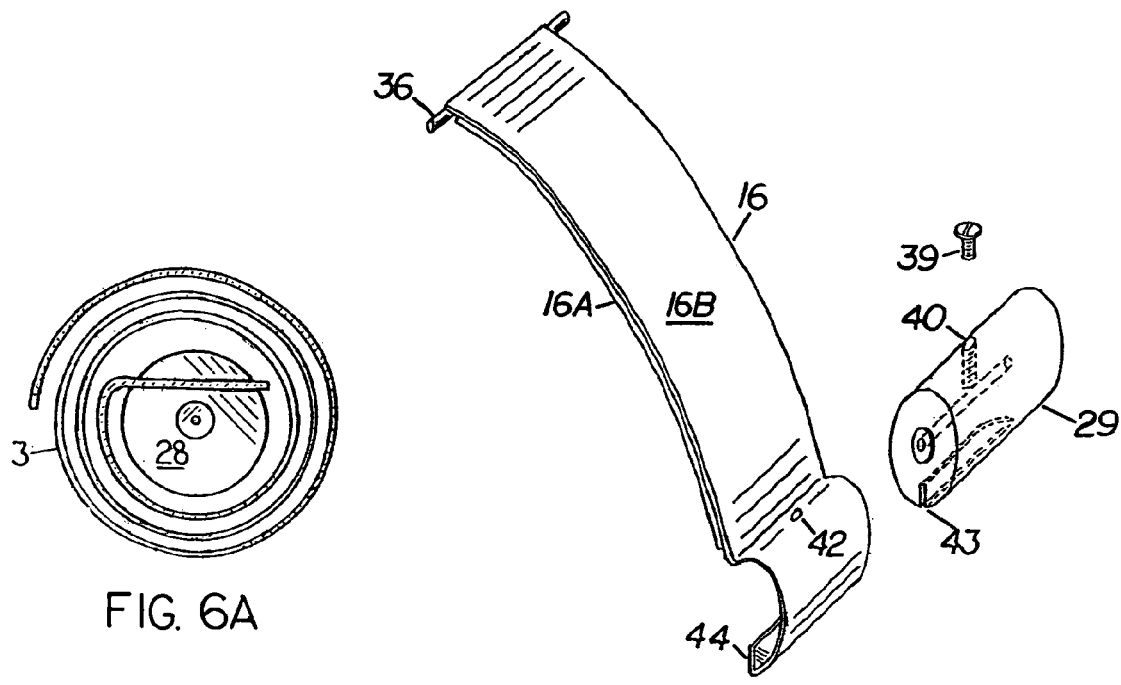
FIG. 6A
FIG. 6
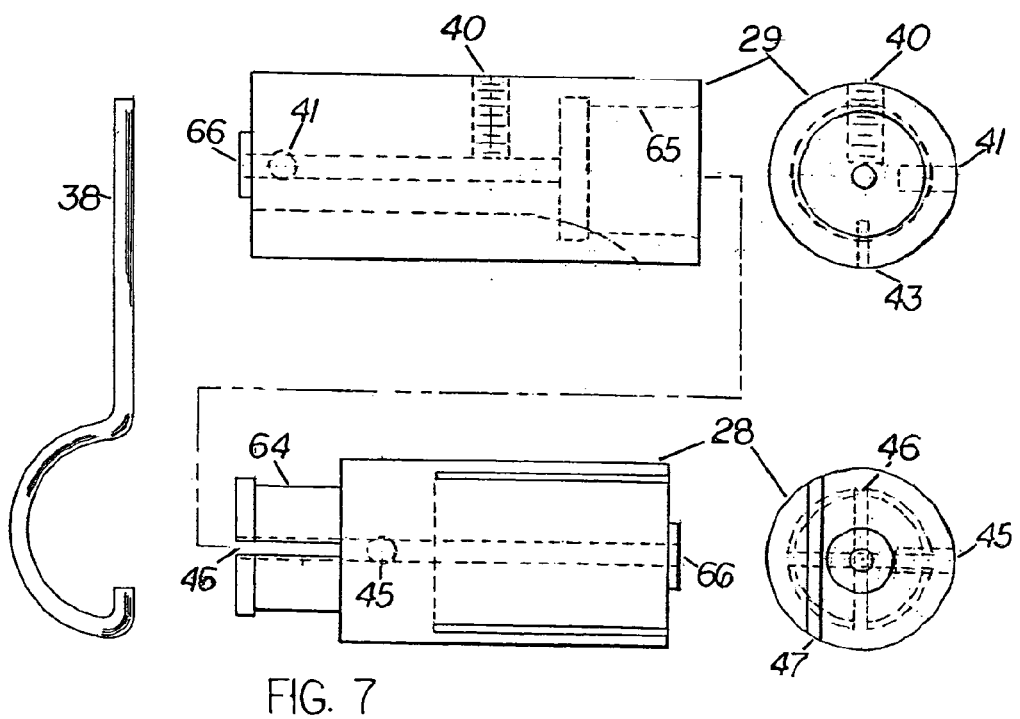
FIG. 7

HOME COMFORT CONTROL USING COMBINED TEMPERATURE AND HUMIDITY MEASUREMENTS

BACKGROUND OF THE INVENTION

This invention is an automatic control mechanism for the control of a heating furnace and/or air conditioning device used to maintain a comfortable temperature in a residence. This invention does not involve any equipment directly involved with heating or cooling.

Thermostats for typical single family residences measure only dry bulb temperature for heating or for air conditioning. Yet it is universally known that human comfort is closely related to the combination of temperature and humidity. For example, a simple wall thermostat responds to 77 degrees F. and 20% RAH. in the same manner that it responds to 77 degrees F. and 90% R.H. in spite of the vast difference in human comfort. The thermostat of this invention recognizes this difference in comfort and adjusts dry bulb temperature to give essentially constant comfort over a range of temperature and humidity. Its usefulness is limited to residences that do not have equipment specifically for maintaining a desired relative humidity.

BRIEF SUMMARY OF THE INVENTION

This invention improves upon cited U.S. Pat. No. 5,732,879 by correcting a measurement deficiency, making the device easier to adjust, reducing its size and making it more suitable for commercial production and home owner use. In addition, this invention serves as a means to take advantage of an unexpected phenomenon that significantly reduces the energy cost of air conditioning in a typical single family residence.

FIG. 2 shows an operating line 48 for a conventional thermostat with respect to temperature and humidity. Operating line 48 is moved to a higher or lower temperature by moving the thermostat's set point as shown by 50. FIG. 3 shows an inclined operating line 49 for the thermostat of this invention. Operating line 49 may also be moved to a higher or lower temperature as indicated by moving its set point 50. The slope of operating line 49 in FIG. 3 shows that as humidity increases, dry bulb set point temperature decreases to maintain constant comfort. Operating line 49 has a nominal slope of −1 degree F/8% R.H., but it may be varied over a limited range to suit a personal taste. This slope is in agreement with "effective temperature" lines as described by the A.S.H.V.E. (American Society of Heating and Ventilating Engineers) Comfort Chart for Continuous Occupancies of More than Three Hours Duration—from the 1935 Guide.

DESCRIPTION OF DRAWINGS

FIG. 5 shows an exploded view of mechanical parts used to make this thermostat.

FIG. 5A shows an adjustment provided so that more or less rotation of a mercury switch 71 will result from a given change in relative humidity. This adjustment effectively alters the slope of operating line 49 in FIG. 3.

FIG. 6 shows a detail of how a humidity sensitive strip is attached to its hub.

FIG. 6A shows how a temperature sensitive bimetal helix is attached to its hub.

FIG. 7 shows details for both hubs and for one of two identical "spanner" type wrenches used to adjust the angular relationship between the two hubs.

DETAILED DESCRIPTION OF THE INVENTION

Figure 1:
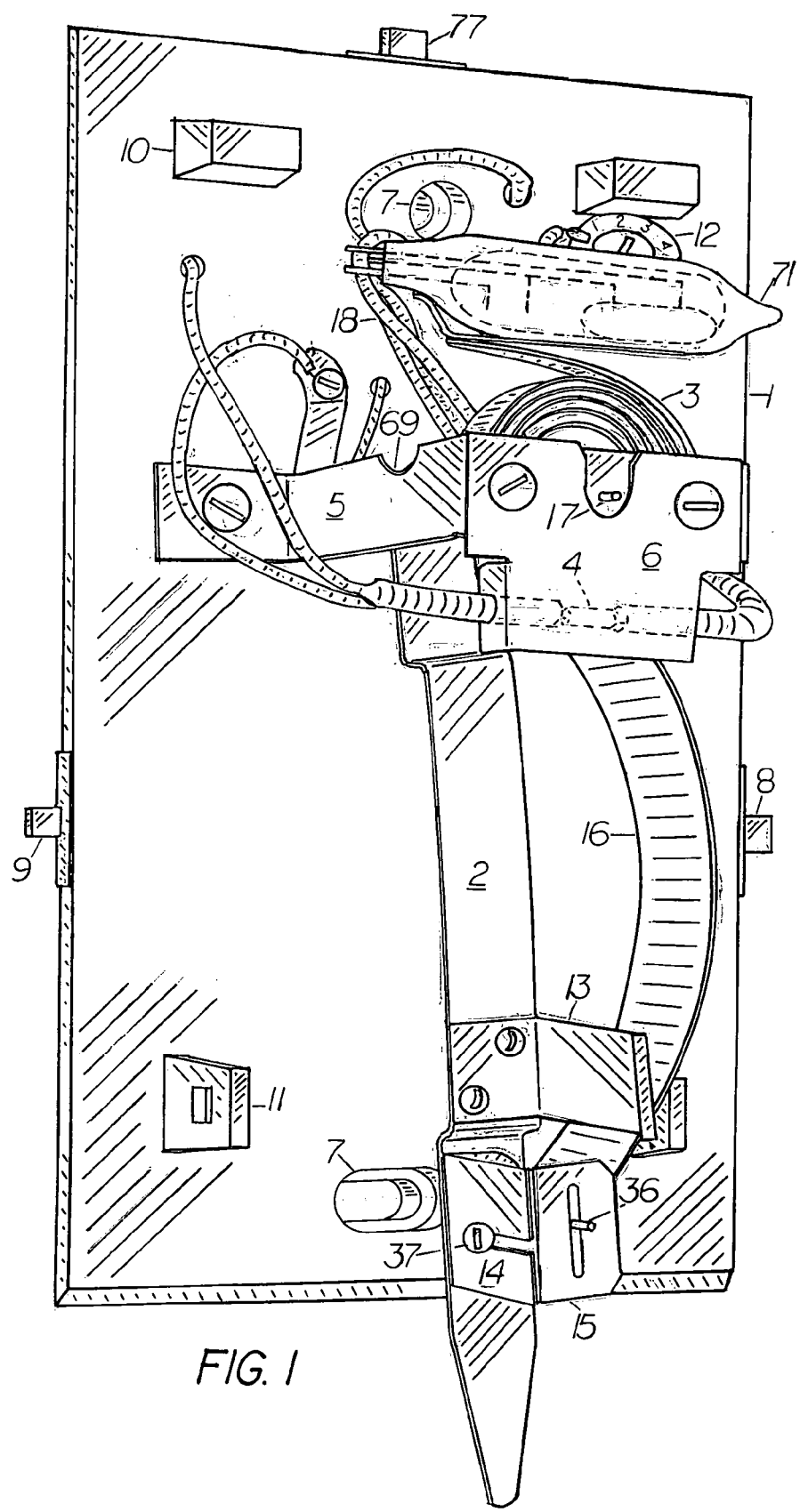
FIG. 1 shows the thermostat assembly without its cover.
Figure 2:
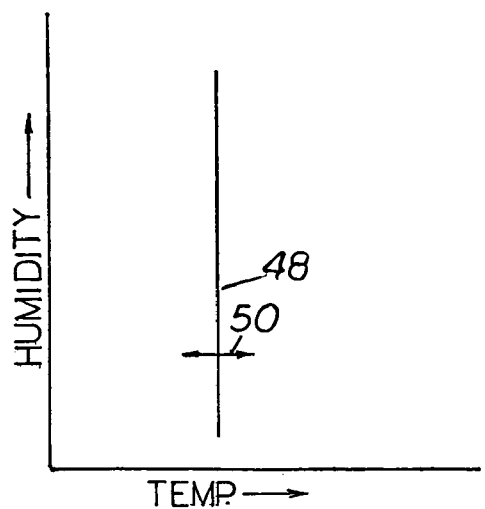
FIG. 2 shows an operating line for a conventional thermostat with respect to dry bulb temperature and relative humidity.

The thermostat of this invention incorporates improvements to the thermostat described by U.S. Pat. No. 5,732,879 (here after referred to as 879). Below are the deficiencies of thermostat 879 and improvements that are part of the present application:

Thermostat 879 and the present thermostat are arranged so that mercury switch 71 in FIG. 1 is balanced atop a temperature-sensitive bimetal spiral 3 which additionally has an incidental spring characteristic. Bimetal spiral 3 is itself positioned by a humidity-sensitive strip 16 that also has an incidental spring characteristic. The humidity strip and the temperature spiral added together form a long spring with mercury in an elongated capsule balanced as a weight at its top end. When mercury in switch 71 moves from one end of its capsule to the other at a control point, the switch effectively moves from one of its bi-stable positions to its second stable position. As a result an excessively large change in temperature and/or humidity is needed to overcome this "dead zone" in the switch's rotation between bi-stable positions. Thermostat 879 has no provision for over-coming this problem, and undesired deviations from a desired temperature appear as cycling.

Conventional thermostats with a mercury switch and bimetal-spiral temperature-element use two electrical resistance heaters called "anticipators" to overcome the above difficulty. For the heating mode an adjustable heating resistor is mounted on an approximately 0.035 inch thick plastic support that is between the resistor and the bimetal. This spaces the heater approximately 4 millimeters from the bimetal. This heater for the heating mode uses current in series with the coil of its furnace control relay. During the air conditioning mode a fixed resistor supplies heat to the bimetal spiral through a metal heat conductor. This second non-adjustable resistor is spaced approximately 4 millimeters from the bimetal, and it is heated by thermostat voltage. In the heating mode, power is on the resistance heater when the furnace is operating. In the cooling mode, power is on the heater when the air conditioner is off. In the heating mode the setting of the adjustable resistor depends upon the resistance of the coil of the furnace control relay. The plastic support for the resistance heater acts as a time delay and as a heat sink that slows heat to the bimetal. In the cooling mode heat conduction through metal that also acts as a heat sink has a similar delay for heat intended for the bimetal. Each of these delays in the heaters slows the response of its heating or cooling cycle. It is thought that these delays are intended to offset the time delay before furnace heat or A/C cool air reaches the thermostat.

In the present thermostat a single electrical-resistance heater 4 is placed approximately 1 millimeter from bimetal spiral 3 in FIG. 1 as a means to overcome the "dead zone" of mercury switch 71. Heater 4 uses radiation to heat bimetal 3 with nothing between the two. There is no intentional delay or heat sink between heater 4 and bimetal 3. Single resistance heater 4 is used for both heating and cooling cycles compared to the two heaters used in a conventional thermostat. A predetermined current through heater 4 is set using a variable resistor 12 in FIGS. 1 and 4. Current generating heat is always applied to resistor 4 when a heat contact 67 is closed in switch 71. This means that heater 4 will warm spiral 3 when its heating furnace is on during the heat mode, and it will also warm spiral 3 when its air conditioner is off during the cooling mode. Variable resistor 12 is adjusted so that heat from resistor 4 is just short of being able to overcome switch 71's "dead zone" when room temperature is constant. Such a setting does not anticipate heat, since final movement of switch 71 to its alternate position is made by a change in room temperature.

Thermostat 879 has its humidity sensitive strip permanently attached to a hub, and its temperature sensitive spiral is also permanently attached to this hub after final assembly. If an alignment adjustment is needed between the set point and measured temperature, it is necessary to bend the humidity strip. In the present thermostat, two separate hubs 28 and 29 in FIG. 7 are used. But when the two hubs are assembled with a slotted projection 64 on hub 28 inside a matching cavity 65 in hub 29, the hubs are held in any desired radial relative position by friction between the two hubs. Two spanner type wrenches 38 are provided as a means to rotate the two hubs radially with respect to each other to achieve alignment. Holes 45 and 41 in the two hubs are provided for the two wrenches 38. It should be noted that alignment of a set point 13 and an indicated temperature 23 in FIG. 5 is not a fixed condition in this thermostat, because its temperature set point varies with humidity.

In thermostat 879, the humidity strip is permanently fixed to its hub. To replace a humidity strip, it is necessary to also replace both hubs, a central shaft and the temperature sensitive spiral. In the present thermostat, a humidity sensitive strip 16 in FIGS. 1, 5 and 6 is made separate from hub 29 as a means for its simple replacement. Strip 16 is held to hub 29 by a screw 39 as shown in FIG. 6.

For thermostat 879 it is suggested that humidity strip 16 should be "glued with an initial curvature of approximately 5" radius". In the present thermostat this has been changed to approximately 2" radius as a means to improve the linearity of switch 71's rotation with changes in humidity.

In thermostat 879, an adjustment to the slot angle as shown by FIG. 5A can only be done by loosening a screw and retightening it through an access hole in the base. This requires inconveniently removing the thermostat from a wall mounting. In FIG. 5 the present thermostat uses a notched pin 19 as a means to attach an adjustable slot holder 14 to an operating lever 2. An arched spring clip 20 fitted into the notch of pin 19 provides force for friction between holder 14 and lever 2. Since a guide slots 15 attaches to slot holder 14, this friction provides a means for adjusting the angle of slots 15 from the front of the thermostat without a tool. In FIG. 5A guide slots 15 in position A gives normal rotation of switch 71 for a given change is relative humidity. Position B gives more rotation of switch 71 for the same humidity change, and position C gives less rotation.

In thermostat 879, a humidity strip is mounted above a central shaft, and an operating lever is mounted below the same central shaft. FIG. 1 shows the present thermostat's operating lever 2 and humidity strip 16 both below a central shaft 17 as a means to reduce overall size of the thermostat.

Thermostat 879 provides only a single on-off contact that can be used for heating or cooling, but it requires external circuits for both to be used. In the present thermostat mercury switch 71 in FIGS. I and 4 provides contact 67 for heat and a contact 68 for cooling. A switch 8 further provides position 62 for heat and position 63 for cooling as a means for user selection. Switch 8 also has a center-off position.

Figure 4:
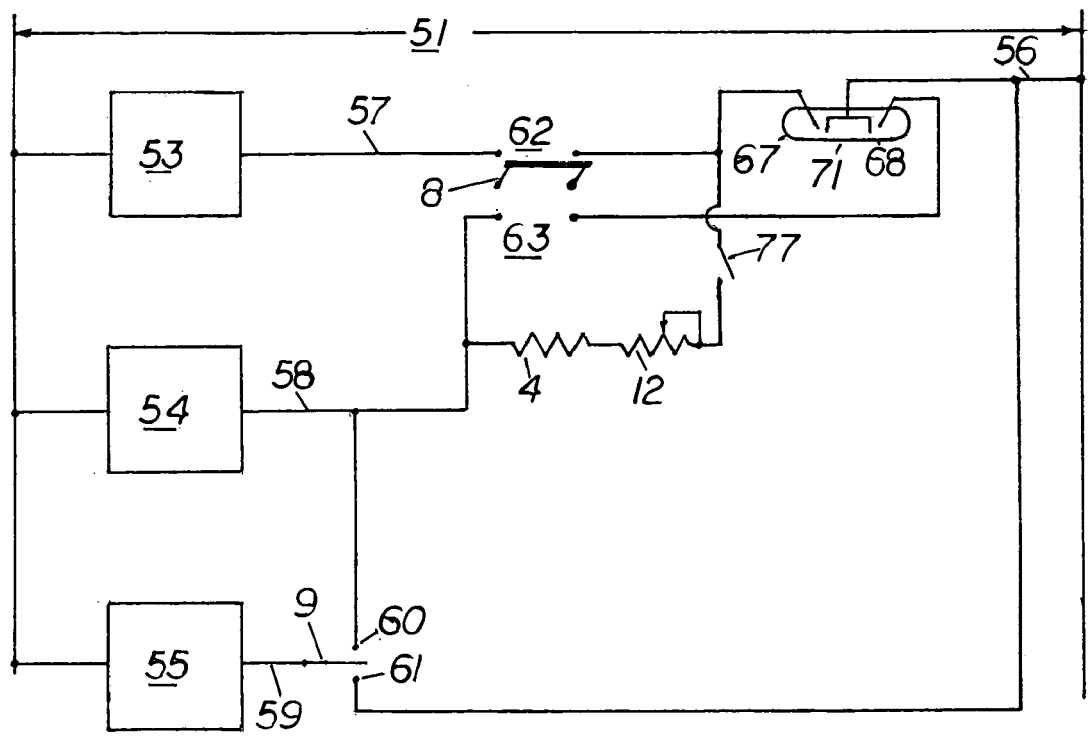
FIG. 4 shows a schematic wiring diagram for the thermostat of this invention.

Thermostat 879 has no provision for control of an air-circulating fan which normally comes on automatically with central air conditioning (hereafter referred to as A/C). In FIG. 4, this thermostat with switch 8 in A/C position 63 and a fan switch 9 in an automatic position 60 causes activation of a fan control 55 whenever mercury switch 71 is in A/C position 68. Fan control 55 is activated any time a manual position 61 is closed in switch 9.

Thermostat 879 has only two connections to its mercury switch. Usual residence wiring for heating and A/C has at least four wires from a basement or utility area to the thermostat. In FIG. 4 this thermostat uses a power connection 56, a heat connection 57, an A/C connection 58 and a fan connection 59 as a means to make this thermostat compatible with existing and future four-wire home installations.

Thermostat 879 has no cover. The present thermostat includes a cover 21 in FIG. 5 as a means to protect it from transient hazards.

Thermostat 879 has no recessed holes for its wall mounting and leveling. The present thermostat has recessed screw holes 7 in FIGS. 1 and 5 that allow wall mounting and leveling.

Construction Details

The thermostat is mounted on a base 1 in FIGS. 1 and 5 that is preferably molded plastic. Base 1 is hollowed to allow a space for wiring and fittings between a wall and base 1. Base 1 is molded with a bearing surface 72 to accept an inboard bearing 30. Base 1 also has wall-mounting holes 7; two side switch holes 35, a top switch hole 78 and hanger tabs 10 and 11 for mounting cover 21 using cover tabs 26 and 27. Tabs 11 also act as travel limits for operating lever 2. Base 1 includes holes for mounting a bridge 5, variable resistor 12 and for miscellaneous wire passages.

Figure 3:
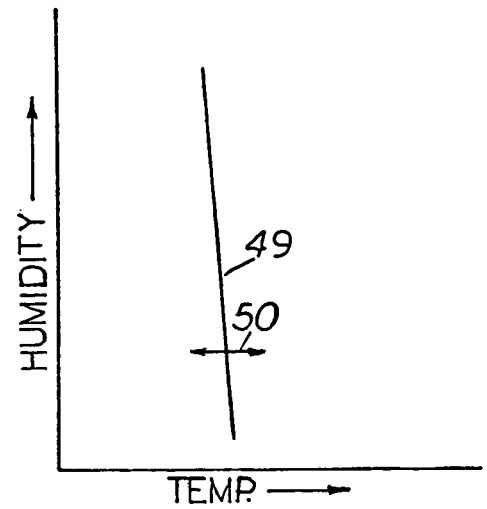
FIG. 3 shows an operating line for the thermostat of this invention with respect to dry bulb temperature and relative humidity.

Rear bearing 30 is inserted into a matching hole 79 in Operating lever 2 and welded or otherwise made a permanent part of lever 2. Lever 2 carries position indicator 13. Lever 2 further carries a rotatable guide-slot holder 14 that is held to lever 2 by a notched pin19 and an arched spring clip 20. Guide slots 15 is attached to holder 14 by a screw 37. Friction between lever 2 and holder 14 allows an angular adjustment of guide slots 15 with respect to humidity strip 16 as shown by FIG. 5A. In FIG. 5A a position A for guide slots 15 causes normal rotation of mercury switch 71 for a given change in humidity. In position A guide slots 15 aim at hub 29. Position B causes greater rotation of switch 71 for the same change in-humidity. Position C causes less rotation. Changes from parallel position A alter the slope of operating line 49 in FIG. 3, and changes from parallel toward C should be limited to less than 20 degrees. Screw 37 moving in an elongated slot 76 allows lateral adjustment of guide slots 15 as a means to space strip 16 with respect to guide slots 15 to avoid any frictional contact between them.

Lever 2 is attached to base 1 using washers 32, a spring 33 and a self-locking nut 34. Nut 34 is tightened against spring 33 to give smooth operating friction to lever 2.

A humidity sensitive strip 16 in FIG. 6 is made by attaching a humidity sensitive material 16A to a curved springy backing 16B that is insensitive to humidity. For example, 16A may be double weight photographic enlarging paper with emulsion side out, and backing 16B may be 0.007 inch thick brass shim stock curved to an approximate 2-inch radius. A corrosion resistant wire guide 36 is glued or otherwise attached to backing 16B. Wire 36 is a close fit into guide slots 15 in FIGS. 1 and 5 with negligible friction. The opposite end of backing 16B in FIG. 6 is formed to partially encircle a plastic hub 29 with a tab 44 to match a slot 43 in hub 29. A hole 42 in backing 16 B matches a threaded hole 40 in hub 29, and a screw 39 in hole 40 fixes strip 16 to hub 29.

A second plastic hub 28 in FIGS. 5, 7 and 6 A carries bimetal helix 3 in a slot 47. Helix 3 in turn carries mercury switch 71. Helix 3 is shown in FIG. 6A as it is glued, for example, into hub 28. In FIG. 7 hub 28 has a reduced section 64 that has slots 46 crossed at right angles, and it has a raised rim at its outer end, Both hubs are drilled lengthwise for a snug fit onto common corrosion-resistant shaft 17. Both hub 28 and 29 have raised end-bosses 66 to act as thrust bearings after assembly. Both hubs are drilled 41 and 45 to accept a spanner wrench 38. Two spanner wrenches 38 are used later as necessary to align the thermostat's set point 13 and an indicating thermometer 23 in FIG. 5. In assembly both hubs are threaded onto shaft 17 as shown in FIG. 5. Reduced section 64 is radially compressed and inserted into cavity 65 in hub 29. Section 64 and cavity 65 are the same size or section 64 may be slightly larger in diameter than cavity 65. Such construction will leave the four quarters of section 64 compressed radially to produce friction between-hubs 28 and 29 as a means to hold them in radial alignment.

Mercury switch 71 and Bimetal spiral 3 may be purchased as an assembly from a supplier such as Precious Metals, Inc of 1704 Borns St., Reidsville, N.C. 27320, for example. The assembly may be purchased with one degree of rotation of switch 71 for a change of one-degree F. in temperature, for example.

A brass bridge 5 in FIG. 5 is rotated 90 degrees from its installed position so that its shape can be better shown. Bridge 5's installed orientation is shown in FIG. 1. Bridge 5 is drilled 74 for screws attaching it to base 1. Bridge 5 is also drilled for an outboard bearing 73 for shaft 17. In FIG. 1 a cut out 69 in bridge 5 provides clearance for wires 18 from switch 71. Threaded holes 75 are for mounting resistance heater support 6.

A preferably molded plastic cover 21 protects the thermostat from tampering and transient hazards. Openings 31 and spacing from base 1 permit free air circulation through the thermostat. A thermometer 23 attached to cover 21 can be seen through an opening 22 and read on a scale 25. Position indicator 13 can be viewed through an opening 24 for comparison to thermometer 23.

FIG. 4 shows wiring for the thermostat when used in a typical residence with both heating and A/C and a fan that operates whenever A/C is operating. A coil 53 operates a power relay for a heating, device. A coil 54 operates a power relay for a cooling device. A coil 55 operates a power relay for a fan used in conjunction with heating and/or cooling. A power supply 51 for the thermostat is usually 24 volts, 60 hertz in the U.S. Current demand will depend upon coil resistances, but it is likely to be under 2 amps. Other voltages and hertz may be used with proper regard for insulation and wire size. Switch 8 is DPDT with a center-off position. Switch 9 is SPDT. with no center-off. The fan is either manually on in position 61, or it will automatically come on with A/C when switch 9 is in position 60. A switch 77 is SPST for on-off control of current to resistance heater 4 and variable resistor 12. Switch 77 will normally be in its on position unless complete power removal is necessary for electrical maintenance. Physical form of the switches is not critical as long as they perform as indicated in FIG. 4.

Mercury switch 71 has power-to-heat contact 67 and power-to-A/C contact 68. Switch 77 should be combined with switch 8, but such a switch was not readily available for the prototype.

Heater 4 's resistance must be high enough so that its current will be well below dropout current for either coil 54 or 55. Typically, heater 4 will be 6000 ohms for a maximum current of 4 ma for coil 54 if switch 9 is manually on in position 61. If switch 9 is in position 60, the 4 ma current will divide between coils 54 and 55. The 6000-ohm resistance of heater 4 will limit its heat to approximately 0.1 watts. Typically, variable resistor 12 is 0 to 5000 ohms. Typical heat needed for resistor 4 is 0.03 watts when resistor 4 is typically spaced 1 mm from helix 3 in FIG. 1.

Typically, four or more wires connect a heating-cooling thermostat to a basement or utility area. This thermostat requires four external connections. In FIG. 4 these wires are power wire 56, heat wire 57, A/C wire 58 and fan wire 59.

Comparison Test

This thermostat was tested against a newly purchased conventional thermostat to measure the quality of its performance in controlling A/C. The test was made in a single-family residence having gas heat and a 38,000 Btu/Hr. A/C capacity. Control wires from a basement area were connected to a multi conductor connector, and the two side-by-side thermostats were fitted with mating connectors on short extensions. This connection method was used so that the two thermostats could be interchanged easily without touching them which could jiggle a set point. By trial and error the two set points were set at 76.5 degrees F. using a laboratory type glass thermometer while relative humidity was at 72%. Set points were not touched during the month-long test. From Aug. 8, 2003 until September 2 the thermostats were alternated for control of A/C essentially each day. A/C running time was measured by a clock wired in parallel with the system's air fan which comes on automatically with A/C. Cooling degree-days (CDD) was taken from the next day's local paper for each day. Cool air return from the evaporator was typically 60 degrees F.

At the end of the test the conventional thermostat had controlled for 15 days and run a total of 98.4 hours. Total CDD for the 15 days was 171. The thermostat of this invention had controlled for 13 days, and it had run a total of 62.8 hours. CDD for the 13 days was 167.

Average conventional CDD=171/15=11.4

Average this thermostat CDD=167/13=12.8

Average hours for conventional=98.4/15=6.56 Hrs. run time/day

Average hours for this thermostat=62.8/13=4.83 Hrs. run time/day

Percent difference=(6.56−4.83)×100/6.56=26.4%

Conventional Hr/CDD=98.4/171=0.575 Hrs. run time/CDD

This thermostat Hrs./CDD 62.8/167 =0.376 Hrs. run time/CDD

Percent difference=(0.575−0.376)×100/0.575=34.6%

Much shorter runtimes for the thermostat of this invention were unexpected and first thought to be an error. However, close observation of the two thermostats showed significantly different operating patterns. In Delaware where the test was done, a typical A/C cooling day starts at 9 to 10 am, continues through the day as needed and ends usually before midnight. Morning operations were similar, except this thermostat often started at a lower temperature than the conventional thermostat because of high humidity. Daytime operation was similar, and both thermostats called for full time A/C for periods on several days showing the A/C as undersized. However, there was a significant difference in the ways the thermostats shut down at the end of the A/C operating day. Because of a long operating period during the day, inside humidity at the end of the day was usually 10 to 15 percent lower than starting humidity. As a result this thermostat stopped A/C operation at one to two degrees higher than its morning start at the higher humidity. The conventional thermostat continued A/C operation until its starting temperature of 76.5 F. was reached although it was not needed for comfort because of lower humidity.

This test shows that the thermostat of this invention can be used as a means to reduce air conditioner operating time and cost at essentially constant comfort by allowing dry bulb temperature to rise appropriately as humidity decreases during a typical day's air conditioner operation. It also becomes evident that most benefit from this thermostat will be found in areas of high humidity such as east and gulf coasts of the U.S.A.

These observations also suggest that the difference between the two thermostats would be even greater if A/C cooling capacity were properly sized or oversized for the test building. A properly sized or oversized A/C with lower evaporator air outlet temperature causing lower humidity would result in an even greater difference in run times for the two thermostats. This thermostat should be especially suited to increase comfort where the A/C is oversized and occupants become cold from low humidity.

A conventional thermostat does not give credit to the air conditioner for comfort that comes from reduced humidity.

No definitive tests were run using the thermostat in the heat mode. However, it was noted during an extended heating period that heat control was stable and free from cycling or "under-shoot". There was no change to variable resistor 12 or to resistor 4 from the A/C test above. As during A/C service the thermostat's set point responded to variations in humidity. Most of the observed changes were in the direction of an increased temperature set point in response to lower humidity which improves comfort, but also increases fuel cost.

The above test and observation show that a single adjustable resistance heater near the bimetal can be used as a means to over-come the "dead zone" of a mercury switch using a single resistance setting for both heating and air conditioning modes. The test and observation also show that a time delay and heat sink between the bimetal and its heater can be omitted from a thermostat without degradation of control.

The foregoing description of the preferred embodiment of the invention has been presented for the purpose of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

The invention claimed is:

1. A thermostat built on a base, said base having provisions for wall mounting, leveling and electrical connections, said thermostat further comprising a temperature sensitive bimetal spiral and a humidity-sensitive paper-like material laminated to a curved spring-metal strip, responses of said temperature and humidity sensitive elements being physically combined to give a single rotation to a tilt-type three-contact mercury switch mounted on outside end of said bimetal spiral, said thermostat embodying a single resistance heater for said bi-metal spiral as a means to overcome a "dead zone" in motion of said mercury switch, said single heater being directly adjacent to said bimetal spiral without touching said spiral, heat from said resistance heater being adjustable by a variable resistor in series with said resistance heater, said series resistors being supplied by thermostat voltage, said variable resistor using a single heat setting for both heating and cooling modes independent of external air conditioning or furnace relay-coil resistance, said bi-metal spiral having its inside end joined to a hub, said humidity sensitive strip being removably joined to a hub, said hubs being joined together in an alignment-adjustable friction fit on a common shaft, opposite end of said humidity element being guide-slot attached to an operating lever by a friction adjustable slot angle, said operating lever pivoting about a center common to said hub of said bi-metal spiral and to said hub of said humidity sensitive strip, said operating lever embodying a set point indicator, said operating lever serving as an inboard bearing for said shaft, a "U" shaped structure attached to said base provides an out board bearing for said shaft, said base further embodying wiring and operating mode selection switches for heating, air conditioning, fan operation, and also for said variable resistor, said wiring further providing terminal connections to said heating, air conditioning and fan equipment and a common power source, said thermostat further comprising a protective cover, said cover further comprising a thermometer and a set point scale.

* * * * *